United States Patent [19]

Nakajima et al.

[11] Patent Number: 5,194,968
[45] Date of Patent: Mar. 16, 1993

[54] COMMUNICATION APPARATUS

[75] Inventors: Toshifumi Nakajima, Tokyo; Shigeru Koizumi, Saitama; Kenji Kurita, Tokyo; Yuji Kurosawa, Kanagawa, all of Japan

[73] Assignee: Canon Kabushiki Kaisha, Tokyo, Japan

[21] Appl. No.: 750,697

[22] Filed: Aug. 20, 1991

Related U.S. Application Data

[63] Continuation of Ser. No. 402,897, Sep. 5, 1989, abandoned.

[30] Foreign Application Priority Data

Sep. 6, 1988 [JP] Japan ................... 63-223902

[51] Int. Cl.⁵ .................................. H04N 1/00
[52] U.S. Cl. ................... 358/438; 358/400; 358/419; 358/434
[58] Field of Search ............... 358/434, 435, 436, 437, 358/438, 439, 400, 419, 420, 421, 422, 423, 468

[56] References Cited

U.S. PATENT DOCUMENTS

| | | | |
|---|---|---|---|
| 4,142,214 | 2/1979 | Yamazaki et al. | 358/435 |
| 4,476,421 | 10/1984 | Moriguchi | 318/696 |
| 4,505,574 | 3/1985 | Kurata et al. | 355/14 |
| 4,591,921 | 5/1986 | Nakajima | 358/257 |
| 4,647,721 | 3/1987 | Busam et al. | 379/102 |
| 4,727,576 | 2/1988 | Yoshida | 358/468 |
| 4,729,033 | 3/1988 | Yoshida | 358/435 |
| 4,773,080 | 9/1988 | Nakajima et al. | 375/5 |
| 4,800,439 | 1/1989 | Yoshino | 358/438 |

FOREIGN PATENT DOCUMENTS

| | | |
|---|---|---|
| 61-106067 | 10/1986 | Japan. |
| 8602797 | 5/1986 | PCT Int'l Appl. |

*Primary Examiner*—Edward L. Coles, Sr.
*Assistant Examiner*—Thomas D. Lee
*Attorney, Agent, or Firm*—Fitzpatrick, Cella, Harper & Scinto

[57] ABSTRACT

A communication apparatus includes a unit for starting power supply in accordance with external conditions, a unit for supplying power to the apparatus in accordance with a signal from the starting unit, and a unit for stopping power supply by the power supply unit after a predetermined operation such as a communication operation is completed.

6 Claims, 10 Drawing Sheets

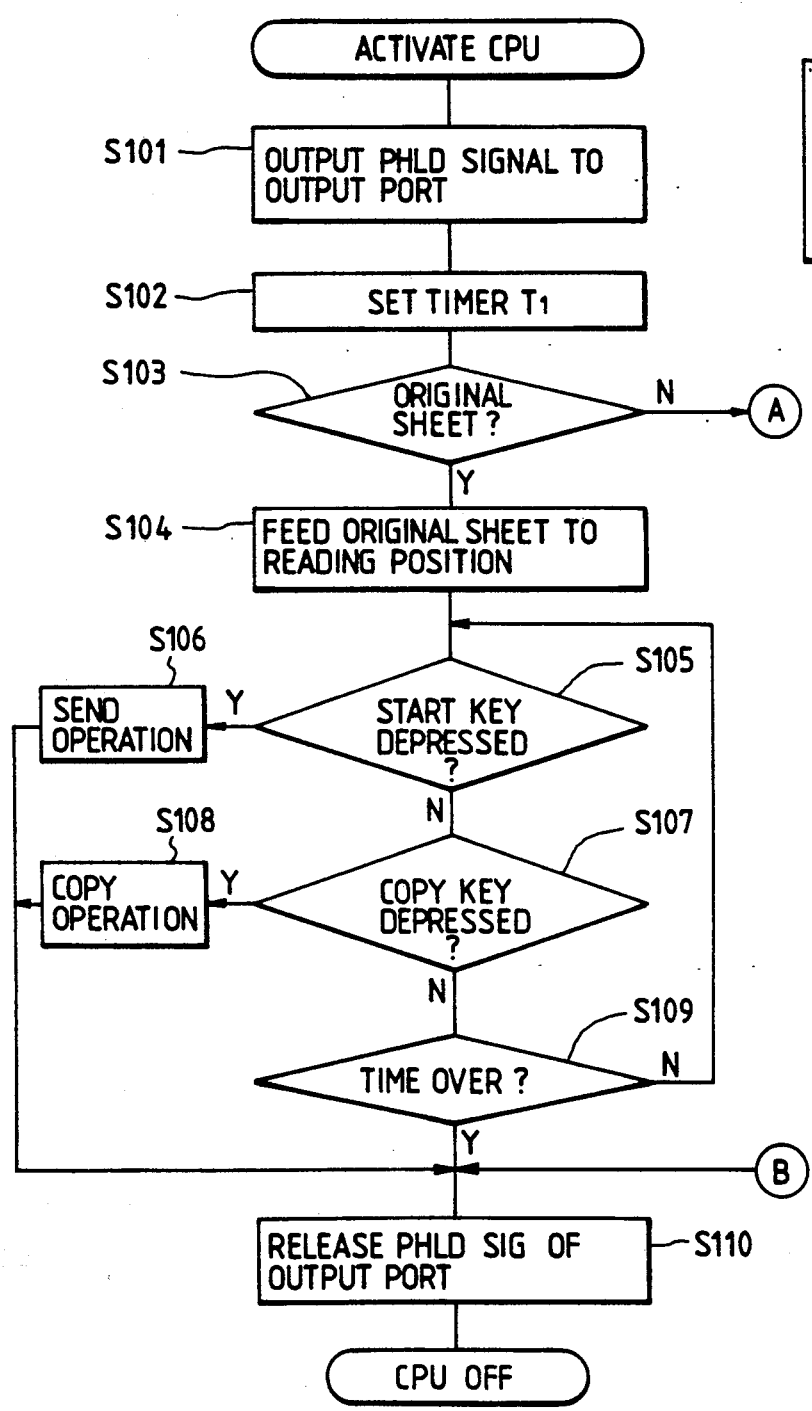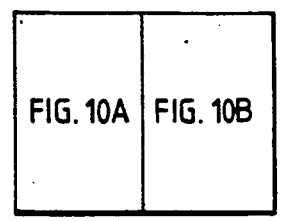

5,194,968

COMMUNICATION APPARATUS

This application is a continuation of application Ser. No. 402,897, filed Sep. 5, 1989, now abandoned.

BACKGROUND OF THE INVENTION

1. Field of the Invention

The present invention relates to a communication apparatus and, more particularly, to power supply of a communication apparatus.

2. Related Background Art

A conventional communication apparatus, e.g., a facsimile apparatus is arranged as follows because the apparatus has an automatic receive function.

(1) A stand-by power source function is provided for a power source unit so that part of the power is supplied during a wait period and total power is supplied upon automatic receive operation (as in a middle- or high-class machine shown in FIG. 2).

(2) Total power is normally supplied from a power source unit (as in a lower-class machine shown in FIG. 3).

In the apparatus of item (1) described above, however, an arrangement of the power source unit is complicated, and the manufacturing cost is increased.

In the apparatus of item (2), although an arrangement of the power source unit is simplified and the manufacturing cost is low, power consumption during a stand-by period is increased. In addition, this apparatus has problems of heat dissipation and safety during the stand-by period.

SUMMARY OF THE INVENTION

It is an object of the present invention to solve the above conventional problems and improve a communication apparatus.

It is another object of the present invention to provide a communication apparatus which does not consume much power during a stand-by period of the apparatus.

It is still another object of the present invention to provide a communication apparatus which starts power supply in accordance with external conditions such as reception of a calling signal or an operation start instruction and stops power supply upon completion of an operation.

It is still another object of the present invention to provide a communication apparatus which starts oscillation of an oscillation power source circuit in accordance with the external conditions as described above and stops oscillation of the power source circuit upon completion of an operation.

The other objects of the present invention will become apparent from the following detailed description of embodiments and accompanying drawings.

DETAILED DESCRIPTION OF THE PREFERRED EMBODIMENTS

Preferred embodiments of the present invention will be described in detail below with reference to the accompanying drawings.

Figure 1:
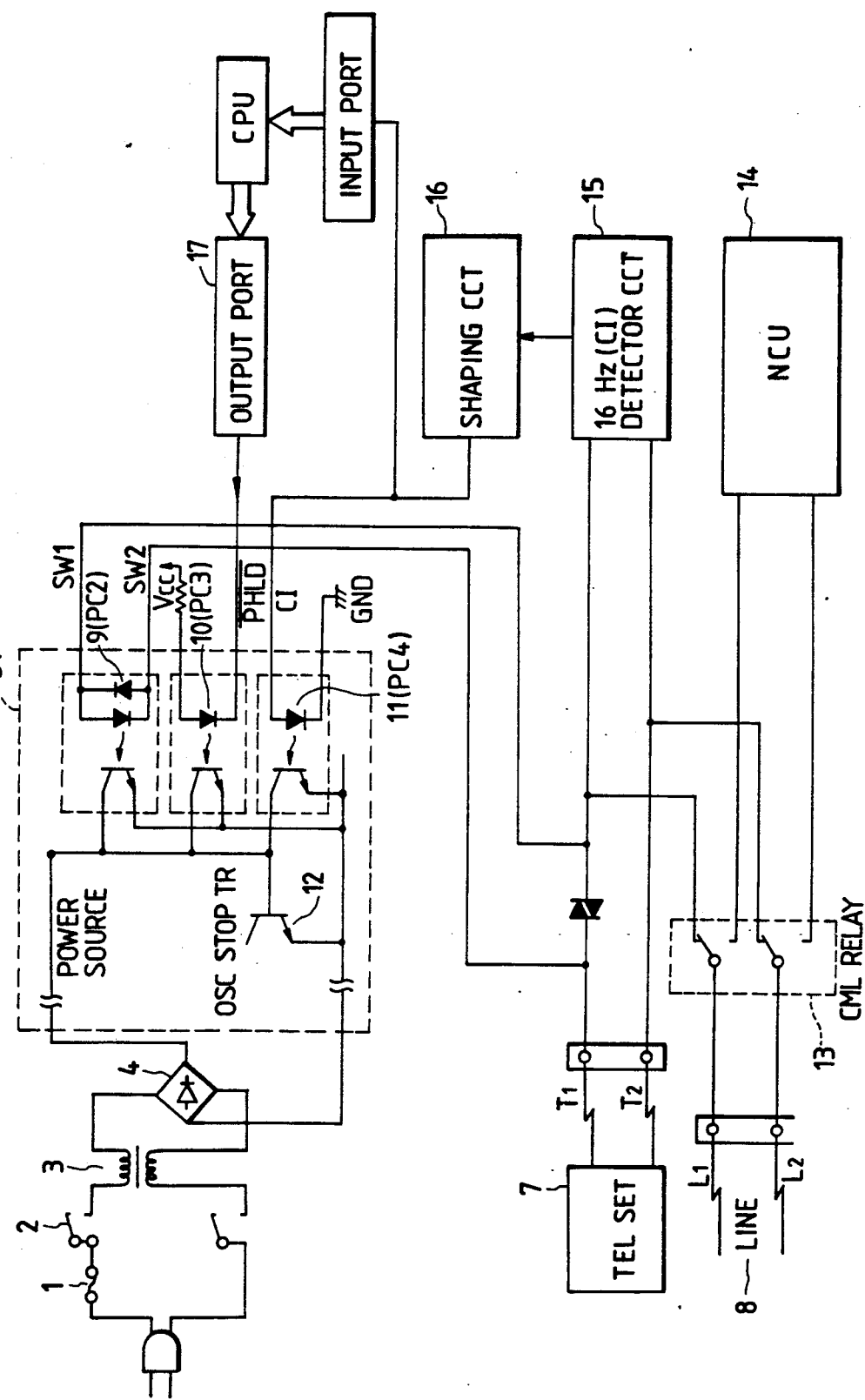
FIG. 1 is a block diagram showing an arrangement of a first embodiment of the present invention.
Figure 2:
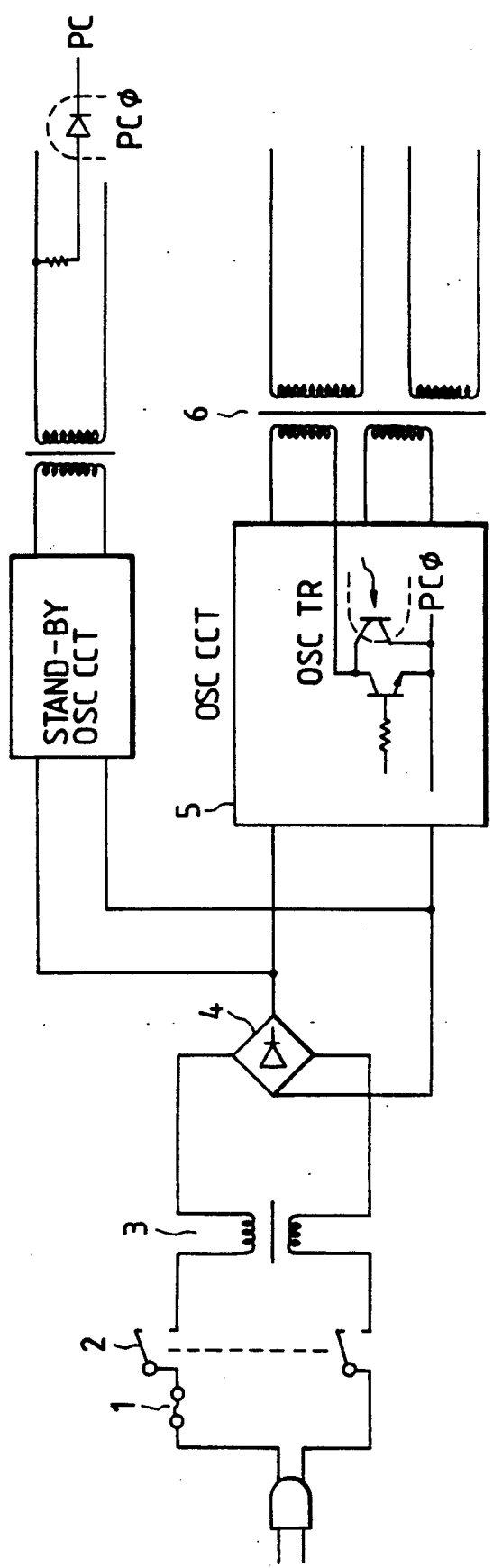
FIG. 2 is a block diagram showing an arrangement of the conventional apparatus (1)
Figure 3:
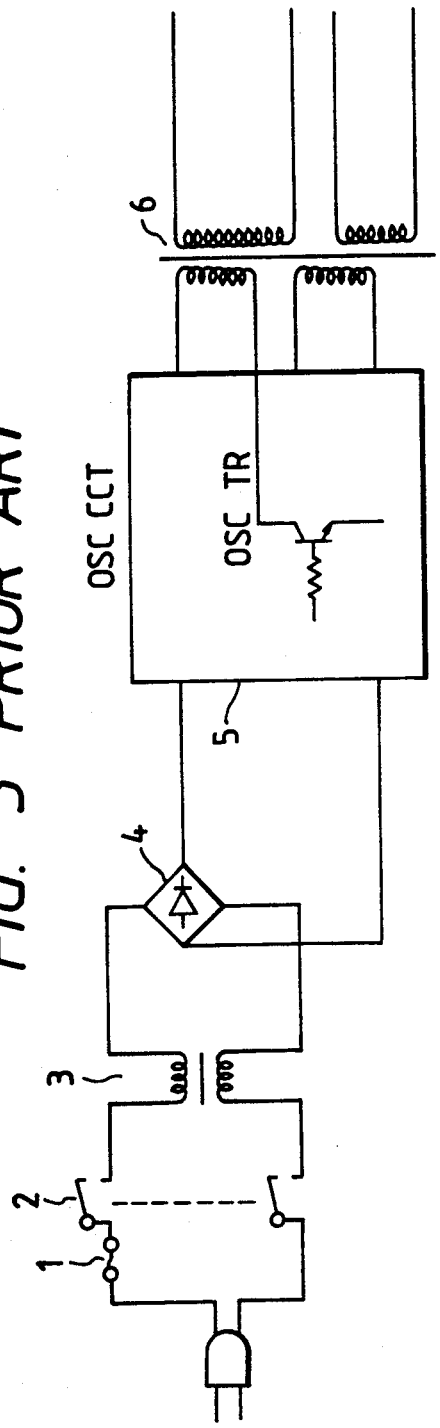
FIG. 3 is a block diagram showing an arrangement of the conventional apparatus (2)

FIG. 1 is a block diagram showing an arrangement of the first embodiment. Referring to FIG. 1, a fuse 1 for preventing an overcurrent, a power source switch 2, a line filter 3, and a rectifier circuit 4 are connected to an oscillation circuit 51. A telephone set 7 and a line 8 are also included in the apparatus. A transistor 12 for controlling an oscillation operation is normally ON to stop oscillation of the oscillation circuit 51 of a power source. When oscillation of the oscillation circuit 51 is stopped, no power is supplied to the apparatus. Photocouplers 9, 10, and 11 ON/OFF-control the oscillation stop transistor 12. A light-emitting portion of the photocoupler 9 (PC2) includes bidirectional photodiodes and is connected in series with one of lines L1 and L2.

When the line is open, no current flows through the light-emitting portion of the PC2. When a handset of the telephone set 7 is taken from the hook to close the line, however, a DC loop is formed, and the light-emitting portion of the PC2 emits light to turn off the oscillation stop transistor 12, thereby starting oscillation. A signal $\overline{PHLD}$ is supplied from an I/O port 17 of a control unit (CPU) of a main body of a facsimile apparatus. That is, the signal $\overline{PHLD}$ is generated under the control of the CPU (comprising a microcomputer) which is activated immediately after the power source is enabled. This signal is active at low level ("0" level). When a signal $\overline{PHLD}$ goes to low level, the oscillation stop transistor 12 is turned off, and oscillation is started. When a calling signal (16 Hz) is sent from the line, a light-emitting portion of the photocoupler 11 emits light to turn off the oscillation stop transistor 12, thereby starting oscillation. The communication apparatus also includes a 16-Hz (CI) detector circuit 15 and a shaping circuit 16 for integrating a signal CI and supplying a current to the light-emitting portion of the photocoupler 11 (PC4) for a predetermined time. A network control unit (NCU) 14 controls a network of the communication apparatus.

Figure 4:
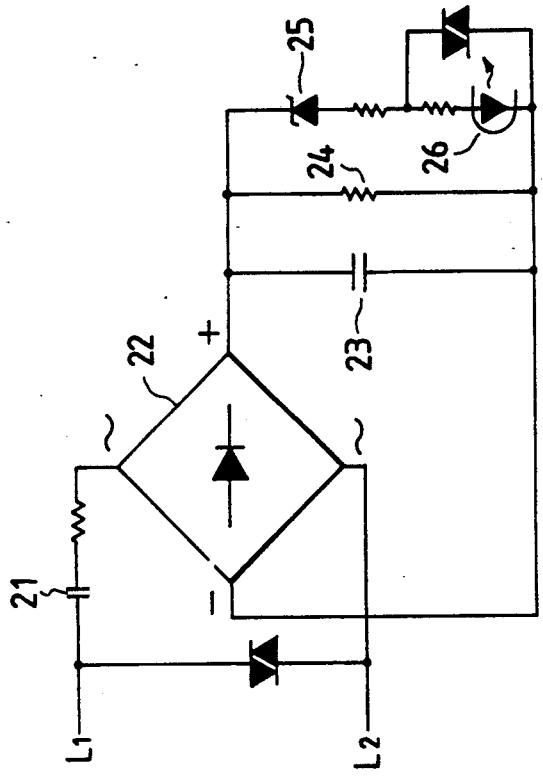
FIG. 4 is a circuit diagram showing an arrangement of a shaping circuit of the first embodiment.

FIG. 4 is a circuit diagram showing the shaping circuit 16 shown in FIG. 1. The shaping circuit 16 comprises a DC cut capacitor 21, a rectifier circuit 22, a smoothing capacitor 23, and a resistor 24 having a large resistance for discharging the capacitor 23, a Zener diode 25 for identifying the signal CI (calling signal), and a light-emitting portion 26 of the photocoupler 10 (PC3) shown in FIG. 1. A signal which responds to the signal CI(16 Hz) is obtained by integrating the CI by these circuits.

An operation of the first embodiment will be described below with reference to a flow chart shown in FIG. 5. When oscillation of the power source is started to activate the CPU of the communication apparatus, the signal $\overline{\text{PHLD}}$ from the OUT port 17 is fixed at a low level to continue oscillation of the power source in step S01. In step S02, the CPU checks in accordance with a signal from the 16-Hz detector circuit 15 whether the signal CI (16 Hz) is sent. If the signal CI is detected in step S02, the flow advances to an automatic receive operation in step S03. If the signal CI is not sent, a 10-sec timer is started in step S04, and the PCU checks in step S05 whether a start key (not shown) is depressed. If the start key is depressed, the flow advances to a send or receive operation in accordance with the presence/absence of an original sheet. If the start key is not depressed, depression of a copy key (not shown) is checked in step S07. If the copy key is depressed, the flow advances to a copy or feed operation in accordance with the presence/absence of an original sheet in step S08. If the copy key is not depressed, time over of ten seconds is checked in step S09. If time over is not determined, the flow returns to step S05. If time over is determined, the signal $\overline{\text{PHLD}}$ from the OUT port 17 is set at a high level in step S10. As a result, oscillation of the oscillation circuit 51 of the power source is stopped, and power supply to the communication apparatus is stopped accordingly. Note that after the operation is completed in step S03, S06, or S08, the signal $\overline{\text{PHLD}}$ is set at a high level in step S10, and the power source is disabled.

That is, in accordance with external conditions such as reception of a calling signal or off-hook of the telephone set 7, the transistor 12 is turned off, the oscillation circuit 51 of the power source unit starts oscillation to supply power to the apparatus. When a communication or copy operation is completed, the transistor 12 is turned on to stop oscillation of the oscillation circuit, thereby stopping power supply.

A second embodiment of the present invention will be described below.

Figure 6:
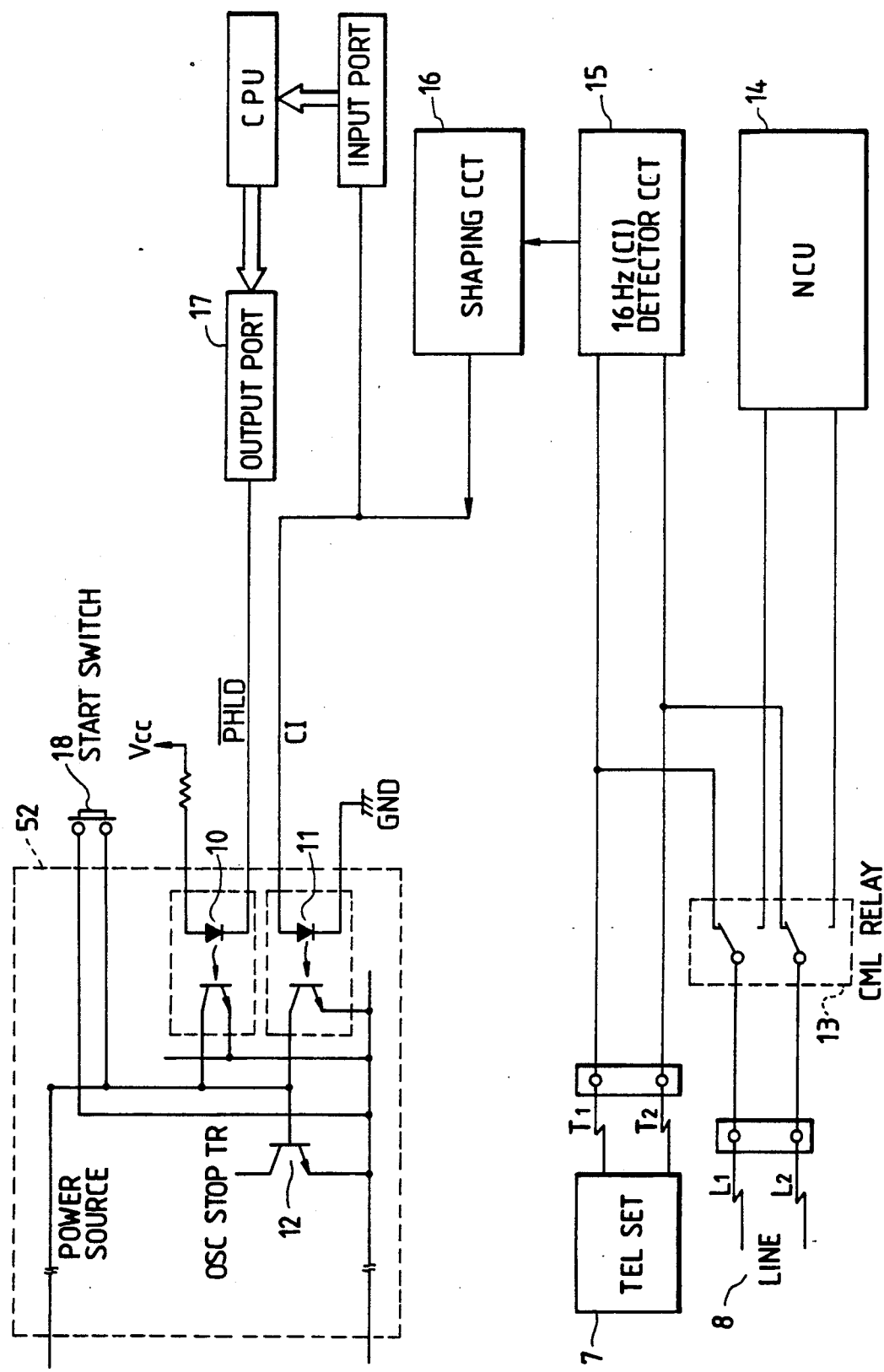
FIG. 6 is a block diagram showing an arrangement of a second embodiment of the present invention.

FIG. 6 is a block diagram showing an arrangement of the second embodiment different from the first embodiment in an arrangement after an oscillation circuit 52. Referring to FIG. 6, a start switch 18 is mechanically arranged. Note that this switch automatically returns (opens) when a predetermined time elapses after it is depressed. When a user depresses the start switch 18 of the communication apparatus, an oscillation stop transistor 12 is turned off to start oscillation.

Figure 7:
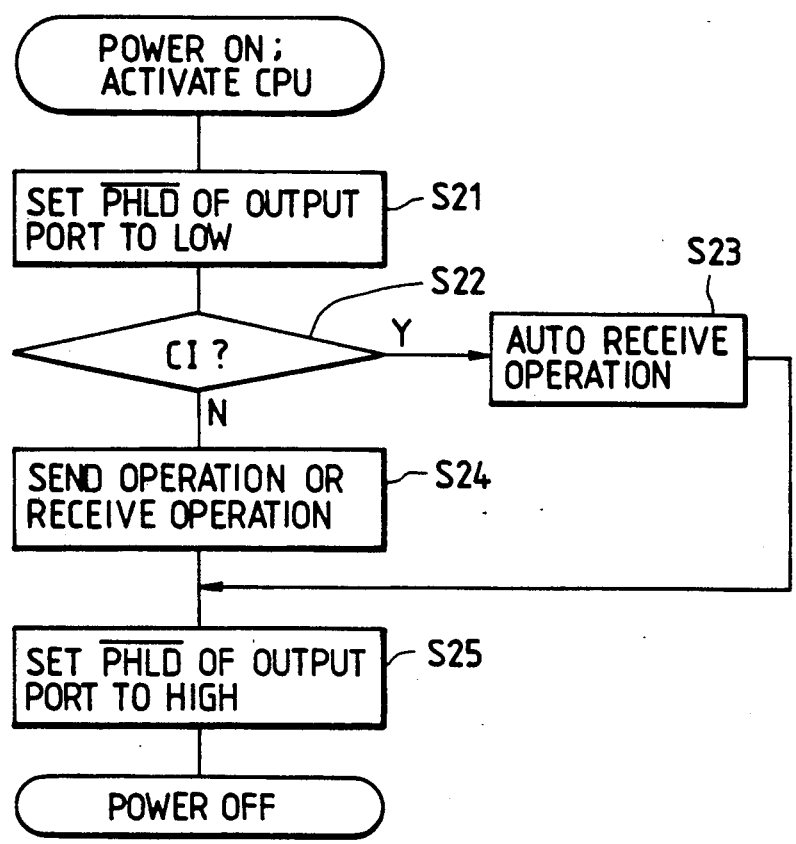
FIG. 7 is a flow chart for explaining a control operation of a CPU of the second embodiment.

FIG. 7 is a flow chart for explaining a control operation of a CPU of the second embodiment. Referring to the flow chart shown in FIG. 7, in step S21, after the CPU is activated, it fixes a signal $\overline{\text{PHLD}}$ at an output port to a low level to continue oscillation. In step S22, the CPU checks whether a signal CI is sent or not. If the signal CI is detected, the flow advances to an automatic receive operation in step S23. If the signal CI is not detected, a send or receive operation is performed in step S24 in accordance with the presence/absence of an original sheet. After these operations are completed, the signal $\overline{\text{PHLD}}$ is set at a high level to stop oscillation in step S25.

Another power source circuit system for reducing power consumption during a stand-by period to substantially "0" will be described below.

In the above embodiments, a switching power source is used as the power source. In the following embodiment, a voltage type power source utilizing a commercial transformer will be described.

Figure 8:
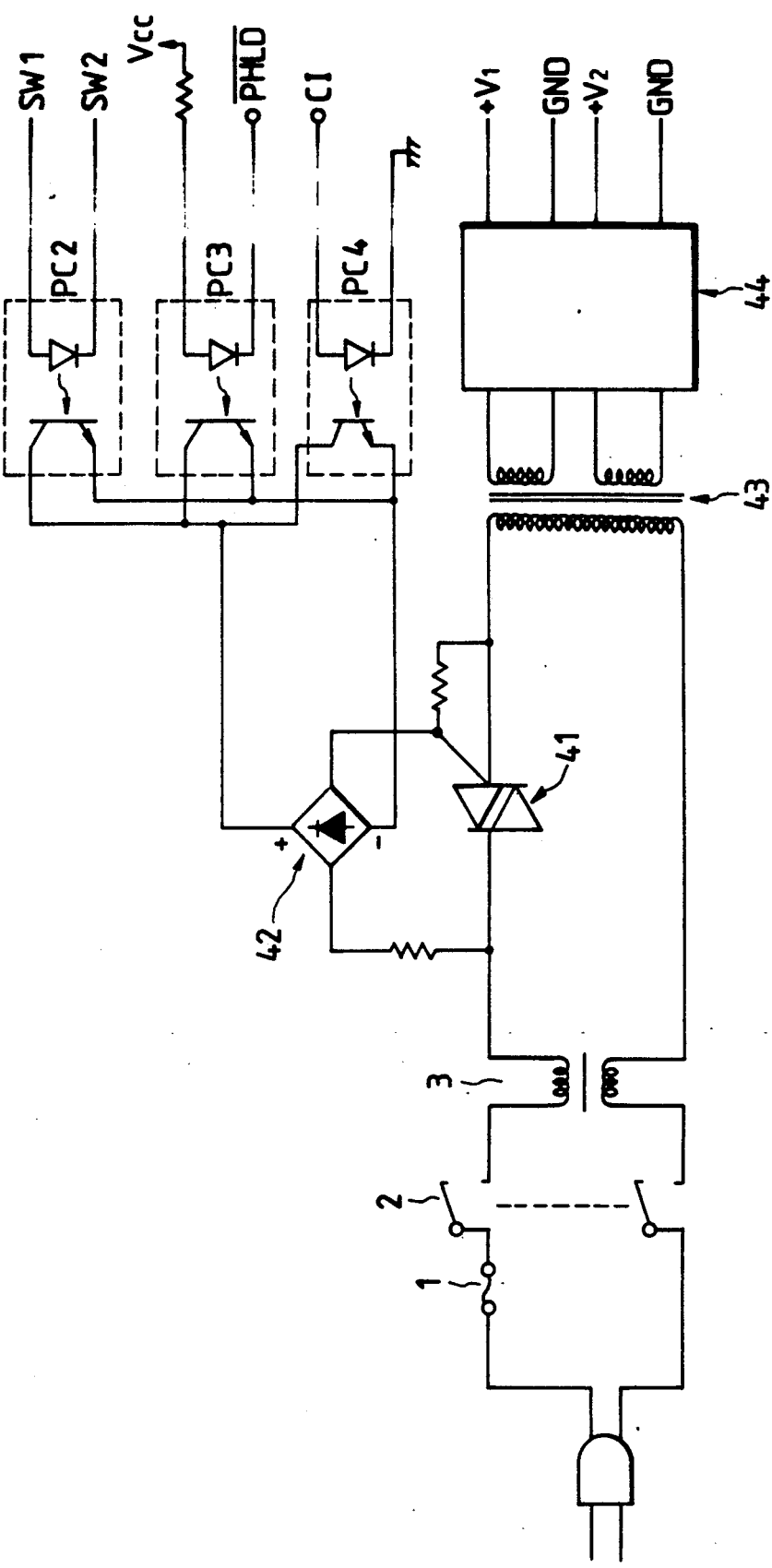
FIG. 8 is a block diagram showing an arrangement of a third embodiment of the present invention.

FIG. 8 is a block diagram showing an arrangement of the third embodiment adopting the voltage type power source. Referring to FIG. 8, this apparatus includes a triac 41, a bridge diode 42, a commercial transformer 43, and a smoothing/stabilizing circuit 44 at the secondary side of the commercial transformer.

An operation will be described below. Normally, when phototransistors of photocouplers PC2, PC3, and PC4 are OFF, no current flows through the bridge diode 42, and the triac 41 is kept OFF. Therefore, no current flows through the transformer 43, and an output from the smoothing/stabilizing circuit 44 is zero.

When a handset of a telephone set is taken from the hook and the PC2 emits light, the phototransistor is turned on to supply a current to the bridge diode 42, and the current flows through the gate of the triac 41, thereby turning on the triac. In this manner, since the current flows through the commercial transformer, a DC output is obtained from the smoothing/stabilizing circuit 44. As a result, a CPU starts operation, and a signal $\overline{\text{PHLD}}$ is kept at low level, thereby maintaining power supply to the triac 41.

The triac 41 can also be turned on by the PC4 which emits light in accordance with a signal CI. In this case, power supply to the triac 41 is maintained by the signal $\overline{\text{PHLD}}$ as in the above operation.

In order to turn off the power source output after a series of operations are completed, the CPU sets the signal $\overline{\text{PHLD}}$ at high level to turn off the photocoupler PC3, thereby stopping the gate current to the triac 41. Therefore, the triac 41 is turned off, and the secondary output of the transformer is also turned off.

Figure 5:
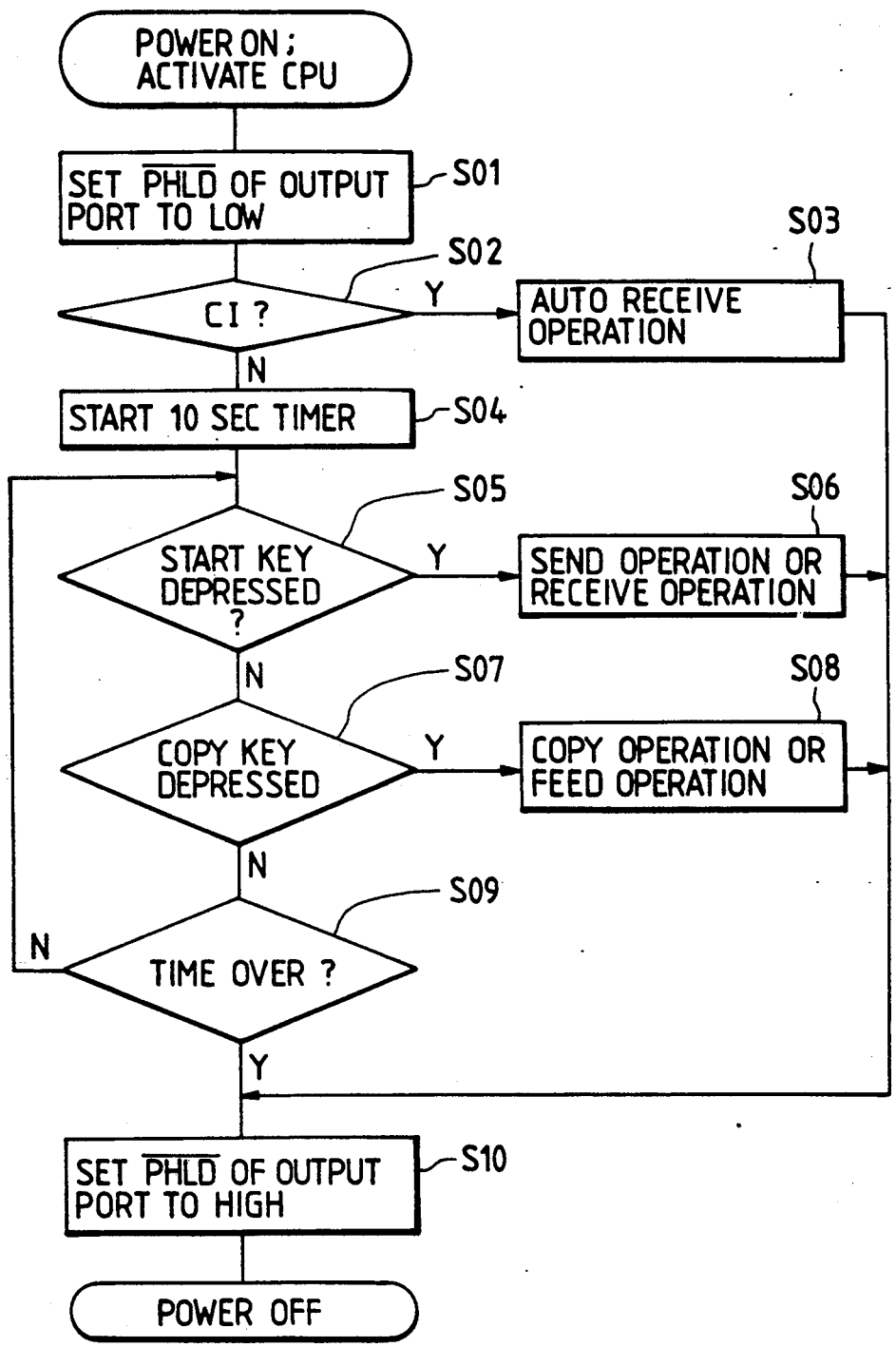
FIG. 5 is a flow chart for explaining a control operation of a CPU of the first embodiment.

A control operation of the CPU in the third embodiment is the same as that shown in the flow chart of FIG. 5.

The fourth embodiment of the present invention will be described below.

Figure 9:
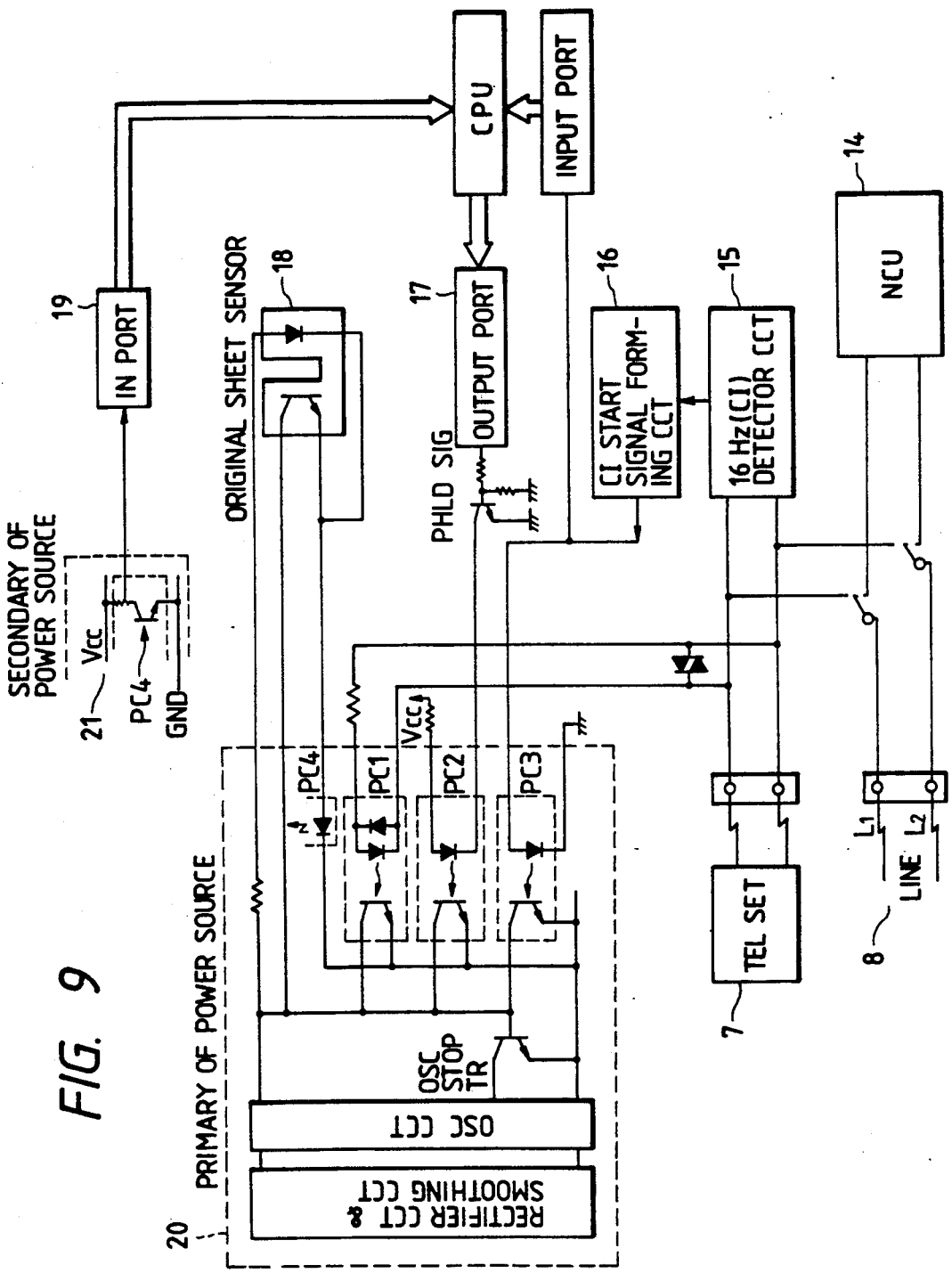
FIG. 9 is a block diagram showing an arrangement of a fourth embodiment of the present invention.

FIG. 9 is a block diagram showing an arrangement of the fourth embodiment.

Note that in FIG. 9, the same reference numerals as in FIG. 1 denote the same parts. Referring to FIG. 9, an original sheet sensor 18 supplies a current of several mA from the primary side of a power source to a light-emitting portion of a photointerruptor and starts oscillation of the power source in accordance with the presence/absence of an original sheet. A circuit 21 supplies information representing that the power source is caused to start oscillation by the original sheet sensor from the secondary side of the power source to a CPU. An IN port 19 receives this information signal. When a handset of a telephone set is taken from the hook to connect a DC loop, the power source detects this by a PC1 and starts oscillation. In this manner, an on-hook operation of oscillation of the power source is controlled by three photocouplers PC1, PC2, and PC3 and the photointerruptor (original sheet sensor) 18.

Figure 10B:
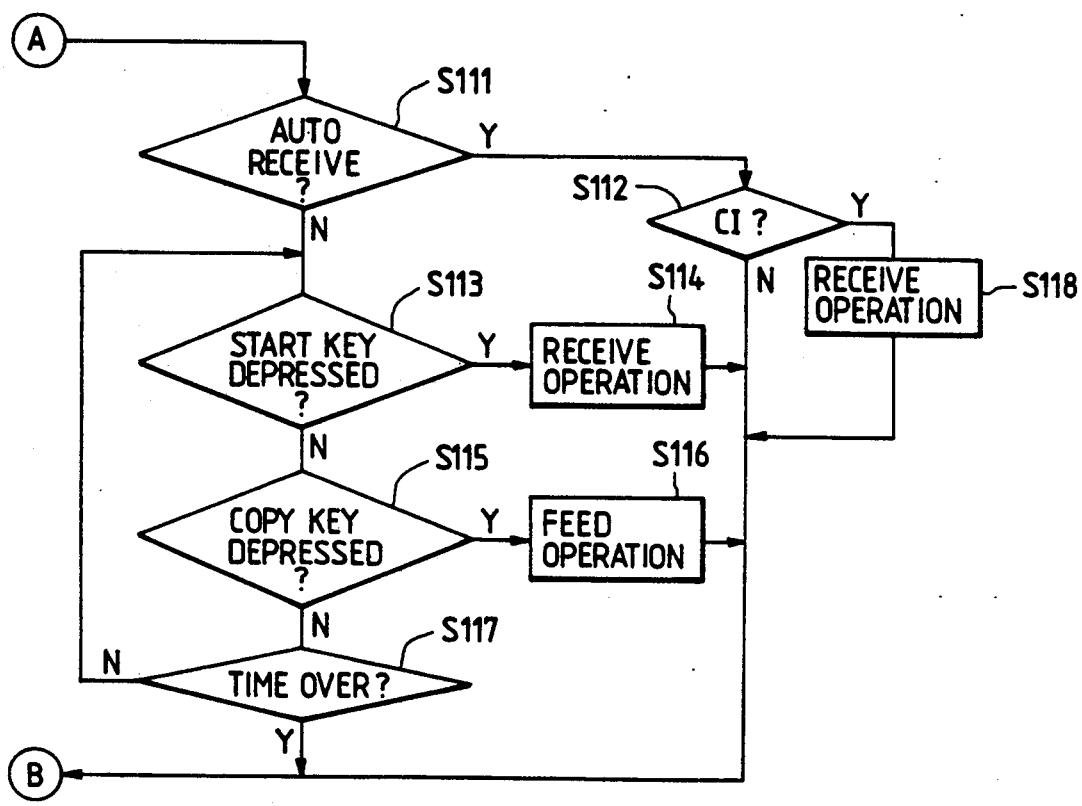
FIG. 10, consisting of FIGS. 10A and 10B is a flow chart for explaining a control operation of a CPU of the fourth embodiment.

An operation of the CPU of the communication apparatus using the above power source will be described below with reference to a flow chart shown in FIG. 10.

When the CPU is activated, it outputs an active signal PHLD from an output port 17 in step S101. Therefore, oscillation of the power source is continued. In step S102, the CPU sets a predetermined value (e.g., 60 seconds), in a timer T1. This value is set in order to turn off oscillation of the power source upon time over. In step S103, in accordance with a signal supplied from the PC4 of the power source to the IN port 19 via the secondary circuit 21, the CPU checks whether an original sheet is present. If an original sheet is present, the flow advances to step S104. If an original sheet is not present, the flow advances to step S111. In step S104, the original sheet is fed to a reading position, and a routine loop for detecting start key depression, copy key depression, and time over in steps S105, S107, and S109, respectively, is performed. If start key depression is detected, a send operation is performed in step S106. After the send operation is completed, the signal PHLD at the OUT port is released, the power source stops oscillation, and the CPU stops an operation. Similarly, if copy key depression is detected, a copy operation is performed in step S108, and the signal PHLD is released in step S110. If time over is detected, the CPU similarly releases the signal PHLD in step S110 and stops an operation. If an original sheet is not present in step S103, the flow advances to step S112 when an automatic receive/manual receive switch on an operation panel is set to the automatic receive side; advances to step S113 when it is set to the manual receive side. In step S112, the CPU checks by the CI detector circuit 15 shown in FIG. 9 whether a signal CI is supplied. If the signal CI is detected, the flow advances to an automatic receive operation in step S118. If no signal CI is detected, the CPU determines that the input signal is noise, and the flow advances to step S110. If the switch on the operation panel is set to the manual receive side, a routine loop of detecting start key depression, copy key depression, and time over in steps S113, S115, and S117, respectively, is performed. If start key depression is detected, a receive operation is performed in step S114. After the receive operation is completed, the flow advances to step S110. Similarly, if time over is detected in step S117, the flow advances to step S110.

As has been described above, according to the present invention, power consumption is reduced during a stand-by period by stopping oscillation of a power source during the stand-by period. In addition, since an apparatus is activated in accordance with a manual-/automatic activation factor, a communication apparatus having a stand-by function can be realized at lower cost with a smaller size than those of conventional apparatuses can be realized.

In the above embodiments, the present invention is applied to a facsimile apparatus. The present invention, however, is not limited to a facsimile apparatus but can be widely applied to various communication apparatuses such as an automatic answering telephone set and a teletex apparatus.

In addition, the present invention is not limited to the above embodiments but can be variously modified.

As described above, according to the present invention, there is provided a communication apparatus which is simple in arrangement and consumes less power in a stand-by period.

What is claimed is:

1. An image data communication apparatus comprising:
   first detection means for detecting an original sheet;
   second detection means for detecting a calling signal;
   control means for receiving detection signals from said first detection means and/or said second detection means to control communication of image data accordingly;
   switching power source means for supplying electric power to the apparatus including said control means which is required for image communication; and
   start means for starting an oscillation operation of said switching power source means in response to a detection by said first or second detection means,
   wherein said switching power source means starts supply of power to the apparatus in accordance with the start of the oscillation operation, and
   wherein said control means starts a control operation in response to the supply of power by said switching power source means, outputs a hold signal to said switching power source means to continue the oscillation operation and inhibits the outputting of the hold signal at the end of image communication to suspend the supply of power.

2. A communication apparatus according to claim 1, further comprising manual instruction means for instructing an operation start, wherein said switching power source means starts an oscillation operation in response to a manual instruction by said manual instruction means.

3. An image data communication apparatus comprising:
   first detection means for detecting an original sheet;
   second detection means for detecting a calling signal;
   control means for receiving detection signals from said first detection means and/or said second detection means to control communication of image data accordingly;
   switching power source means for supplying electric power to the apparatus including said control means which is required for image communication; and
   start means for starting an oscillation operation of said switching power source means in response to a detection by said first or second detection means,
   wherein said switching power source means starts supply of power to the apparatus in accordance with the start of the oscillation operation, and
   wherein said control means starts a control operation in response to the supply of power by said switching power source means, outputs to said switching power source means a hold signal to continue the oscillation operation, and then discriminates a detection signal associated with the start of the supply of power to control communication in accordance with the discrimination result.

4. A communication apparatus according to claim 3, wherein said control means inhibits the outputting of the hold signal at the end of a communication operation to suspend the supply of power.

5. An image data communication apparatus comprising:
   a first detection circuit for detecting an original sheet;
   a second detection circuit for detecting a calling signal;
   a control circuit for receiving detection signals from said first detection circuit and/or said second detection circuit to control communication of image data accordingly;
   a switching power supply circuit for supplying an electric power to the apparatus including said control circuit which is required for image communication, said circuit starting an oscillation operation in response to the detection signal from said first detection circuit of said second detecting circuit, thereby starting a supply of power,
   wherein said control circuit starts is control operation in response to the supply of power, outputs a hold signal to allow said power supply circuit to continue the oscillation operation, and inhibits the outputting of the hold signal at the end of image communication to suspend the supply of power.

6. A communication apparatus according to claim 5, wherein said control circuit discriminates the detection signal associated with the supply of power after the hold signal is outputted, and controls image communication in response to the discrimination result.

* * * * *

UNITED STATES PATENT AND TRADEMARK OFFICE
CERTIFICATE OF CORRECTION

PATENT NO. : 5,194,968
DATED : March 16, 1993
INVENTOR(S) : TOSHIFUMI NAKAJIMA ET AL.

It is certified that error appears in the above-identified patent and that said Letters Patent is hereby corrected as shown below:

COLUMN 3

Line 10, "PCU" should read --CPU--.
    Line 67, "voltage type" should read --voltage drop type--.

COLUMN 4

Line 2, "voltage type" should read --voltage drop type--.

COLUMN 5

Line 43, "ratuses can be realized." should read --ratuses.--.

COLUMN 6

Line 64, "of" should read --or--.

Signed and Sealed this

Twenty-fifth Day of January, 1994

Attest:

BRUCE LEHMAN

Attesting Officer      Commissioner of Patents and Trademarks